United States Patent [19]

Hawkins et al.

[11] 3,724,815

[45] Apr. 3, 1973

[54] HOIST OPERATING HAND WHEEL INCORPORATING AN OVERLOAD PROTECTION MECHANISM

[75] Inventors: Harold V. Hawkins; Ralph A. Dick, both of Williamsville; Alfred M. Parslow, Tonawanda, all of N.Y.

[73] Assignee: Columbus KcKinnon Corporation, Tonawanda, N.Y.

[22] Filed: June 3, 1971

[21] Appl. No.: 149,705

[52] U.S. Cl.....................................254/169, 64/29
[51] Int. Cl. ...............................................B66d 1/00
[58] Field of Search..........254/169, 150, 172; 64/29, 64/27 CS

[56] References Cited

UNITED STATES PATENTS

| | | | |
|---|---|---|---|
| 1,443,026 | 1/1923 | Lee | 64/29 |
| 1,634,912 | 7/1927 | Miller | 254/172 |
| 2,347,395 | 4/1944 | Clarke | 254/172 |
| 3,542,341 | 11/1970 | Stevens | 254/169 |

*Primary Examiner*—Harvey C. Hornsby
*Attorney*—Bean & Bean

[57] ABSTRACT

A hoist operating hand wheel including concentric hub and rim portions; the hub portion pivotally supporting three dog-leg shaped arms carrying rollers normally biased by adjustable tension springs into engagement with roller receiving recesses formed in a radially inwardly facing surface of the rim portion. When an attempt is made to raise a load in excess of desired hoist capacity, the rollers are forced to ride out of their associated recesses against the return bias of the tension springs, thereby permitting rotation of the rim portion relative to the hub portion. A single removable cover plate carried by the hub portion affords access for adjusting the tension springs and normally retains the arms and rim portion in assembled position on the hub portion.

5 Claims, 2 Drawing Figures

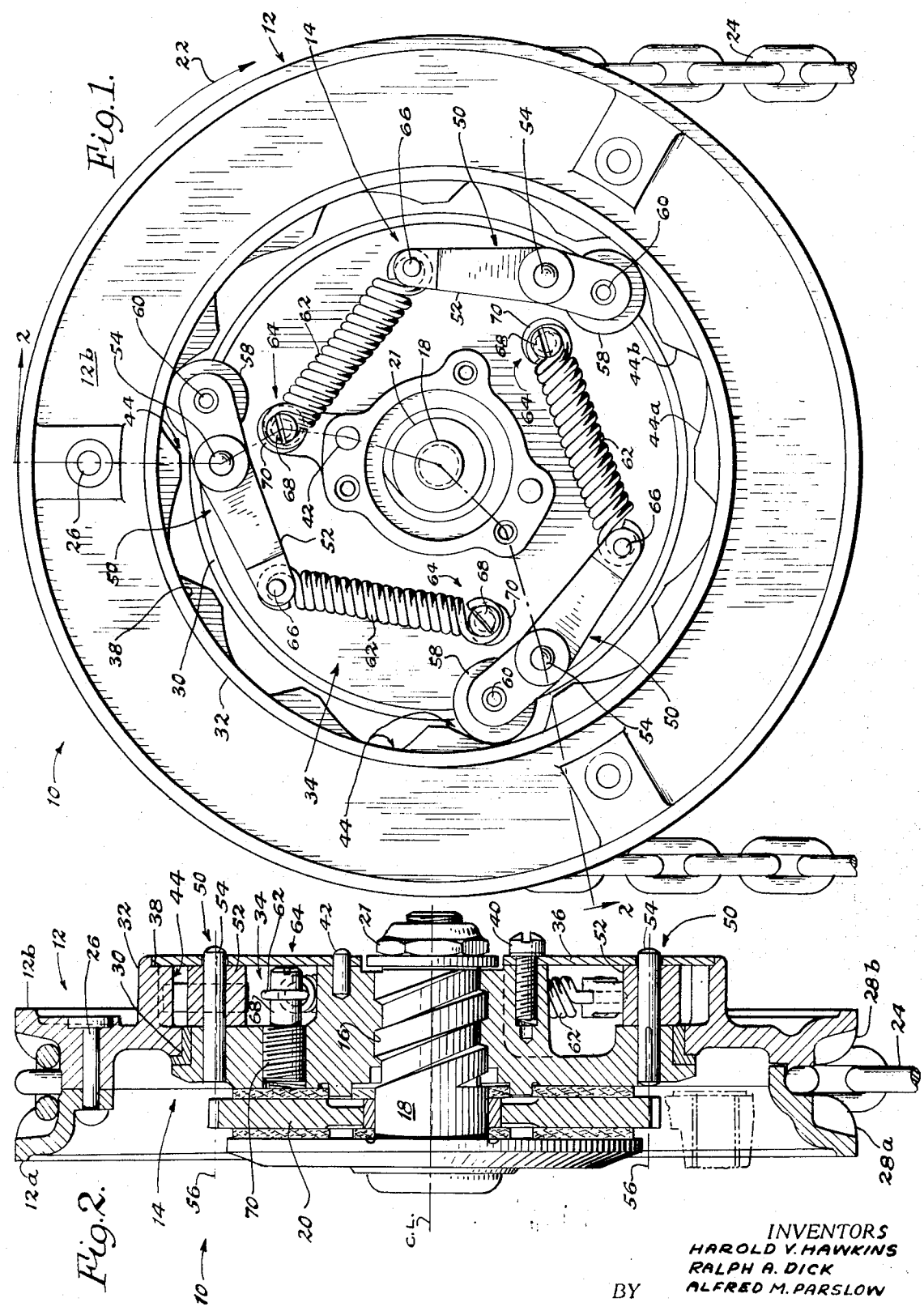

HOIST OPERATING HAND WHEEL INCORPORATING AN OVERLOAD PROTECTION MECHANISM

SUMMARY OF THE INVENTION

The present invention relates to a novel hand wheel construction, and more particularly to improvements in hand wheels of the general type disclosed by U.S. Pat. No. 3,542,341, wherein a hoist overload protection mechanism is incorporated within the hand wheel.

The hand wheel construction of the present invention features a hub portion, which is adapted to be drivingly interconnected to a load lifting wheel of a hoist to be protected against overloading, and a rim portion, which is journaled on the hub portion and drivingly engageable by a manually operated hoist operating chain.

The hub and rim portions cooperate to define an annularly shaped axially opening recess in which a plurality of arms are journaled intermediate the ends thereon on hub portion carrier pin shafts for pivotal movements about axes arranged essentially parallel to the axis of hand wheel rotation. A roller is mounted adjacent one end of each of the arms for rotation about an axis parallel to the pivot axis of its associated arm; such roller being normally biased radially outwardly for coupling engagement within roller receiving recesses formed in a radially inwardly facing or cavity bounding surface of the rim portion by means of a tension spring fixed to another end of its associated arm.

When a load connected to the load lifting wheel of the hoist is in excess of desired hoist load capacity, any attempt to manipulate the rim portion for the purpose of lifting such load overcomes the coupling bias afforded by the tension springs, thereby resulting in the rollers being forced to roll out of their associated recesses so as to permit relative rotation between the rim and hub portions. Preferably, the rear surfaces of the recesses are sharply inclined such as to minimize relative movement between the rim and hub portions until the rollers have been completely forced out of the recesses in which they are initially disposed, whereas the front surfaces of the recesses are relatively gradually inclined to permit the rollers to smoothly ride into an adjacent recess, thereby to cushion the resulting shock.

Preferably, each tension spring is a coil spring fixed to the hub portion by means of an anchor device including a pin arranged eccentrically on a base portion adapted to be screw threaded into the hub portion, the eccentricity of the pin and its threaded base permitting adjustments of spring tension, as required.

In a preferred construction, the rim portion and arms are removably retained in assembled condition on the hub portion by means of a hub portion mounted ring-shaped cover, which additionally serves to seal and prevent admission of dirt or the like into the cavity.

The present invention provides a simply constructed, inexpensive hand wheel, which is capable of being readily adjusted to insure accurate overload release control.

DRAWINGS

The nature and mode of operation of the present invention will now be more fully described in the following detailed description taken with the accompanying drawings wherein:

FIG. 1 is a front elevational view of the hand wheel of the present invention having its front plate removed for purposes of clarity; and FIG. 2 is a sectional view taken generally along the line 2—2 in FIG. 1.

DETAILED DESCRIPTION

Now referring more particularly to the drawings, 10 is employed to generally designate the hand wheel of the present invention, which is characterized as having a rim portion 12 and a hub portion 14. As is conventional in hand wheel operated hoist constructions, hub portion 14 is provided with an axially extending or centered screw-threaded opening 16 for reception of the usual screw 18 formed as a part of a Weston type brake 20. Hand wheel 10 may be removably retained on its associated hoist by suitable means, such as nut 21.

When hand wheel 10 is rotated in the direction indicated in FIG. 1 by arrow 22, such as by a downward pull on a manually manipulated link chain 24 trained about a rim portion 12, Weston brake 20 is operable to drivingly connect the hand wheel to a load lifting wheel, not shown, for the purpose of lifting a load, also not shown. Of course, when chain 24 is manipulated to rotate wheel 10 in an opposite direction, Weston brake 20 permits controlled lowering of a load carried by the hoist. Hoist constructions employing Weston or like brakes are well known, and thus, no detailed discussion thereof is deemed necessary.

In FIG. 2, rim portion 12 is shown as being formed from a pair of rim sections 12a and 12b, which are joined in abutting relation by a suitable means, such as a plurality of rivet devices 26, and hub portion 14 is shown as being formed as a one-piece metal casting. Preferably, rim sections 12a and 12b are formed in accordance with the disclosure of U.S. Pat. No. 2,535,985, whereby they are formed with spaced partition elements 28a and 28b, which cooperate to define pockets for accommodating the links of chain 24. Section 12b and thus rim portion 12 are journaled for rotation concentrically of hub portion 14 by a suitable bearing device, such as an annularly extending sleeve 30 of L-shaped cross-section engageable by facing peripheral surfaces of both the hub and section 12b. As best shown in FIG. 2, rim section 12b is formed with an axially extending annular flange or sleeve portion 32, which cooperates with hub portion 14 to define an annular, axially opening cavity 34; cavity 34 being sealed or closed to dirt or the like by a ring-shaped cover member 36, which is fitted within flange portion annular groove 38 and removably fixed to hub portion 14 by threaded fasteners 40. Preferably, dowel pins 42 are fixed to hub portion 14 in order to insure proper orientation of cover member 36 relative to the hub portion prior to insertion of threaded fasteners 40. By forming cover member 36 in the form of a ring, ready access is afforded to nut 21 for purpose of removably mounting hand wheel 10 on screw shaft 18.

As best shown in FIG. 1, the radially inner surface of flange portion 32 is shaped to define a plurality of radially inwardly opening recesses 44. For the reasons to be hereinafter discussed, recesses 44 are preferably formed with gradually sloping and smoothly contoured front wall surfaces 44a and sharply sloping rear wall surfaces 44b, when considered relative to the load lifting direction of hand wheel rotation.

Reference is again made particularly to FIG. 1, wherein hub portion 14 is shown as being of releasably connected or coupled for driven rotation with rim portion 12 by three identical overload devices, which are generally designated as 50 and arranged in an equally spaced relationship circumferentially of hub portion 14. Devices 50 include dog-leg shaped arm members 52, which are journaled intermediate their respective ends on hub portion fixed pin shafts 54 for radial pivotal movements about essentially parallel axes 56. Axes 56 are in turn arranged essentially parallel to the axis of rotation of hand wheel 10, which is designated at C.L. in FIG. 2. A roller 58 is journaled, as by a pin shaft 60, adjacent one bifurcated end of each of arm members 52 for rotation about an axis arranged essentially parallel to axes 56. Each of rollers 58 are normally biased outwardly for engagement within one of recesses 44 by means of a coil type tension spring 62, which is mounted on hub portion 14 by an anchor device 64 and fixed to an opposite bifurcated end of an associated arm member by means of pin shaft 66. For purposes of mechanical advantage, the distance between pin shafts 54 and 66 is made greater than that between pin shaft 54 and 60.

In a preferred form of the present invention, each of anchor devices 64 includes a pin shaft 68, which is annularly slotted to receive a hooked end portion of an associated tension spring 62, and a base portion 70, which is arranged eccentrically of pin shaft 68 and adapted to be screw threaded into hub portion 14. By this arrangement, the tension of springs 62 may be individually adjusted by an amount corresponding to the displacement of pin shaft 68 as a result of a 180° rotation of base portion 70. Of course, if desired, other means may be employed to anchor springs 62 to hub portion 14.

Again referring to FIG. 2, it will be seen that cover member 36, in addition to providing a dirt seal for cavity 34, normally serves to retain rim portion 12 in position on bearing 30; to retain arm members 52 journaled on pin shafts 54; and to prevent accidental adjustments of anchor device 64, due to engagement thereof with objects during use of the hoist. This construction provides for simplicity in construction and ease of assembly, as well as permitting adjustment of the tension springs without requiring the hand wheel to be disassembled or removed from a hoist.

From the foregoing, it will be understood that the maximum load which may be lifted by a hoist with which hand wheel 10 is associated, is determined by the number of tension springs employed, their spring characteristics and/or by adjustments of such springs by anchor devices 64. Normally, it is preferable to employ springs permitting overload release at a load substantially below that load at which structural damage to the hoist and/or a load lifting chain might occur. Thus, when a load connected to the load lifting wheel of the hoist is in excess of a desired hoist capacity, any attempt to rotate rim portion 12 for the purpose of lifting such load overcomes the coupling bias afforded by tension springs 62, thereby resulting in rollers 58 being forced to ride out of their associated recesses 44 and permitting subsequent rotation of rim portion 12 relative to hub portion 14. Relative rotation of rim portion 12 together with the noise produced by rollers moving into successive recesses serves as a clear warning to the hoist operator, as well as others in the area, that an overload condition exists.

By sharply sloping rear wall surfaces 44b of the recesses, relatively insignificant relative rotation of the rim and hub portions is permitted until the overload condition is reached; this being desirable from the standpoint that no 37 slack" or "looseness" is sensed by the operator manipulating chain 24 during normal hoist lifting operation. The relatively slight slope provided for front wall surfaces 44a permits the rollers to smoothly ride into the recesses, thereby to minimize jolting and resulting shocks.

The specific construction of hand wheel 10, as hereinabove described, has been found particularly suitable for use with one and two ton hoists. As will be apparent, the basic construction may, however, be readily modified, as desired, for example by varying the number of overload devices or the type of springs employed.

We claim:

1. A hand wheel having utility in preventing overloading of a load lifting hoist of the type having a drive connection for rotatably supporting the hand wheel, said hand wheel comprising in combination:

a hub portion adapted to be supported by said hoist drive connection for rotation about an axis;

a rim portion for driving said hub portion for rotation about said axis in opposite hoist load lifting and hoist load lowering directions;

bearing means engageable by facing peripheral surfaces of both said rim and hub portions for journaling said rim portion on said hub portion for rotation concentrically outwardly thereof while permitting disassembly of said rim portion from said hub portion upon movement of the former in a direction axially away from said hoist drive connection, said rim portion having an annular flange portion disposed concentrically of said axis and extending in said direction away from said bearing means, said flange portion and said hub portion cooperating to define a cavity opening axially to one side of said hub portion in said direction, and said flange portion defining radially inwardly opening recesses spaced circumferentially of said cavity;

at least one arm member;

means for supporting said arm member on said hub portion within said cavity for pivotal movement about a pivot axis arranged parallel to said axis;

a roller carried on said arm member for rotation about an axis arranged parallel to the pivot axis thereof;

spring means for resiliently biasing said arm member to pivot about its pivot axis in a first direction thereby to normally yieldably maintain said roller in one of said recesses for releasably connecting said hub portion to said rim portion for driven rotations therewith;

a cover member for closing said cavity and releasably maintaining said rim portion assembled on said hub portion; and means for removably fixing said cover member to said hub portion adjacent said one side to extend radially of said axis into engagement with said flange portion, whereby to releasably maintain said rim portion assembled on said hub portion in association with said bearing means.

2. A hand wheel according to claim 1, wherein said means for supporting said arm member includes a pin shaft, and said cover member additionally serves when fixed to said hub portion to releasably retain said arm member on said pin shaft.

3. A hand wheel according to claim 1, wherein said hand wheel additionally includes adjustment means for adjusting said spring means to vary the bias thereof, and said spring means is a tension spring having opposite ends thereof connected one to each of said spring adjustment means and said arm, said spring adjustment means including a screw portion threadably received within said hub portion for rotation about an axis essentially parallel to said pivot axis and a spring end attaching portion mounted eccentrically of said screw portion, whereby upon rotation of said screw portion said attaching portion is moved along a path to vary the tension of said spring.

4. A hand wheel according to claim 1, wherein said hub portion is formed with an opening to accommodate said hoist drive connection to extend axially therethrough, whereby affording access for removably mounting said hub portion on said hoist drive connection from adjacent said one side of said hub portion, said cavity is of an annular configuration, and said cover member is of ring shaped configuration fixed to said hub portion concentrically outwardly of said opening thereof.

5. A hand wheel according to claim 4, wherein said means for supporting said arm member includes a pin shaft, and said cover member additionally serves when fixed to said hub portion to releasably retain said arm member on said pin shaft and wherein aid hand wheel additionally includes adjustment means for adjusting said spring means to vary the bias thereof, and said spring means is a tension spring having opposite ends thereof connected one to each of said spring adjustment means and said arm, said spring adjustment means including a screw portion threadably received within said hub portion for rotation about an axis essentially parallel to said pivot axis and a spring end attaching portion mounted eccentrically of said screw portion, whereby upon rotation of said screw portion said attaching portion is moved along a path to vary the tension of said spring.

* * * * *